United States Patent
Sandmeier

(10) Patent No.: US 8,256,773 B2
(45) Date of Patent: Sep. 4, 2012

(54) CLAMPING FIXTURE INCLUDING A CHUCK FOR RELEASABLY LOCATING A WORKPIECE PALLET

(75) Inventor: Bruno Sandmeier, Seengen (CH)

(73) Assignee: Erowa AG, Reinach (CH)

( * ) Notice: Subject to any disclaimer, the term of this patent is extended or adjusted under 35 U.S.C. 154(b) by 966 days.

(21) Appl. No.: 12/288,607

(22) Filed: Oct. 22, 2008

(65) Prior Publication Data

US 2009/0102143 A1    Apr. 23, 2009

(30) Foreign Application Priority Data

Oct. 22, 2007 (CH) ..................................... 1642/07

(51) Int. Cl.
*B23B 31/10* (2006.01)
(52) U.S. Cl. ....... 279/4.1; 279/4.12; 279/4.02; 279/126; 279/74; 279/123
(58) Field of Classification Search .................... 279/4.1, 279/4.12, 66, 74, 82, 111, 121, 123, 126, 279/157, 4.11, 4.04, 4.09, 4.06, 4.02, 110, 279/57; 409/219; 198/468.2; 269/309
See application file for complete search history.

(56) References Cited

U.S. PATENT DOCUMENTS

| | | | | |
|---|---|---|---|---|
| 2,587,893 A * | 3/1952 | Pridy et al. | ................... | 279/4.11 |
| 3,456,955 A * | 7/1969 | Bruinsma | ................... | 279/2.03 |
| 3,603,203 A * | 9/1971 | Rhodes | ................... | 409/232 |
| 3,692,321 A * | 9/1972 | Shattuck | ................... | 279/4.04 |
| 3,730,539 A * | 5/1973 | Swanson | ................... | 279/4.02 |
| 3,835,649 A * | 9/1974 | Le Testu | ................... | 60/560 |
| 3,904,214 A * | 9/1975 | Manchester | ................... | 279/4.11 |
| 4,504,824 A * | 3/1985 | Mello | ................... | 340/680 |
| 4,604,009 A * | 8/1986 | Tennerstedt | ................... | 409/233 |
| 4,611,814 A | 9/1986 | Hiestand | | |
| 4,645,220 A * | 2/1987 | Hiestand | ................... | 279/111 |
| 4,664,571 A * | 5/1987 | Takada et al. | ................... | 409/134 |
| 4,864,714 A * | 9/1989 | Von Haas et al. | ................... | 483/1 |
| 4,913,606 A * | 4/1990 | Glaser | ................... | 409/232 |
| 5,876,041 A * | 3/1999 | Kuckelsberg et al. | ................... | 279/4.02 |
| 5,961,261 A | 10/1999 | Stark | | |
| 6,160,236 A * | 12/2000 | Nordquist | ................... | 219/69.15 |
| 6,161,826 A * | 12/2000 | Forrer | ................... | 269/309 |
| 6,241,258 B1 * | 6/2001 | Roussel | ................... | 279/4.02 |
| 7,382,145 B2 * | 6/2008 | Thurmaier | ................... | 324/756.04 |
| 2004/0064910 A1 * | 4/2004 | Young | ................... | 15/176.1 |
| 2006/0261534 A1 * | 11/2006 | Yonezawa et al. | ................... | 269/309 |
| 2006/0273504 A1 * | 12/2006 | Yonezawa et al. | ................... | 269/309 |

FOREIGN PATENT DOCUMENTS

DE 267933 A1 5/1989
EP 1175959 A2 1/2002

* cited by examiner

*Primary Examiner* — Daniel Howell
*Assistant Examiner* — Paul M Janeski
(74) *Attorney, Agent, or Firm* — Maginot, Moore & Beck, LLP

(57) ABSTRACT

A clamping fixture features a chuck provided with a locking mechanism for releasably locating a workpiece pallet. The locking mechanism comprises a plurality of clamping members which in the locked position are engineered to engage a clamping spigot connected to the workpiece pallet. Each clamping member, or alternatively an actuating member assigned to a clamping member, is provided with a feedthru bore which on correct locking and/or release of the corresponding clamping members is closed off at one end. The feedthru bores are connectable by a common connecting conduit to a compressed air source. In addition, at least one sensor is provided for sensing air flow in the connecting conduit by means of which it can detected whether the clamping members are correctly released or locked.

13 Claims, 4 Drawing Sheets

CLAMPING FIXTURE INCLUDING A CHUCK FOR RELEASABLY LOCATING A WORKPIECE PALLET

BACKGROUND

The present invention relates to a clamping fixture for releasably locating a workpiece pallet at a chuck.

Such clamping fixtures are put to use preferably for clamping workpiece pallets provided with a tool or workpiece positionally defined, the chuck usually being fixedly located on a work table of a machine tool or a press whilst the workpiece pallet is repeatedly releasably located precisely positioned at the chuck.

In semi- or fully automated machining it is important that the pallet mounting the workpiece being machined is correctly clamped in place on the chuck or totally released therefrom. If the pallet, for example, is not correctly located on the chuck, there is a risk of it shifting the workpiece out of place during machining, for instance during milling, with ruinous consequences. When the pallet needs to be lifted off the chuck after machining it must be assured that the locking mechanism is totally released so that the pallet can be safely unchucked. This is particularly important where heavy pallets are concerned, i.e.—so heavy that they cannot be lifted manually but, instead, require the assistance of a robotic or hoist fixture.

It will readily be appreciated that lifting off a pallet with the clamping members still not fully released can be likewise ruinous and cost-prohibitive. One problem in detecting whether the locking mechanism is fully locked or released is that a central component or central sensor is incapable of recognizing whether individual clamping members are truly locked or released. On top of this, recourse is made usually to monitoring auxiliary variables such as, for example, the pneumatic pressure needed for locking or release in an attempt to detect whether the locking mechanism is working correctly. This proves to be highly problematic, however, because it fails to always ensure a reliable indication as to whether the clamping members are in the extended locked position or in the retracted released position. Should the clamping members tend to become jammed in thus failing to become fully released or locked, then it is very difficult, even impossible, to recognize this by sensing auxiliary variables.

Known from German patent DE 196 36 375 is a quick-release fixture for a pallet. The chuck serving to receive a clamping spigot, termed "pull-in nipple", arranged on the pallet is provided with a feedthru bore. The clamping spigot features knife-like contact surfaces having the task of parting chips and the like resulting from machining. The locking mechanism of the chuck is provided with a plurality of locking pistons serving to fixedly locate the clamping spigot. At its inner, radial end each locking piston features a stop which in the locked condition is seated on a heel of the clamping spigot, non-positively retaining the clamping spigot in the feedthru of the chuck. The stop doubles as a knife for likewise parting ingressed chips. The locking pistons comprise axial feedthru bores, but the document makes no mention whatsoever for what purpose these bores are provided. The chuck is provided with a plurality of ports for jetting it clean.

German patent DD 26733 discloses a chuck with a means for checking workpiece location. The chuck in the form of a vise features two jaws, each drilled with a feedthru hole, both of which are connected by flexible tubings to a stationary base part of the chuck in which a central feedthru is drilled which is connected by a horizontal bore to the two flexible tubings. In the horizontal bore two throttle valves are incorporated. For monitoring the pressure in the tubings and bores pressure sensing means are provided. Clamping a workpiece in place results in an increase in pressure in the branch of the tubing assigned to the corresponding jaw by the workpiece in snug contact within the jaws as can be detected by means of the assigned pressure sensing means.

SUMMARY

The invention has the object of improving a clamping fixture having a locking mechanism for releasably locating a workpiece pallet such that no sensors are needed on the chuck itself to monitor correct functioning of the locking mechanism whilst nevertheless assuring reliable and simple recognition as to whether the clamping members of the locking mechanism are correctly locked and/or released.

In one aspect of the invention, at least one clamping member is provided with a feedthru bore is provided which on correct locking and/or release of the corresponding clamping members is closed off at one end and/or at least one clamping member is assigned a locking pin provided with a feedthru bore which on correct locking and/or release of the corresponding clamping members is closed off at one end, the feedthru bores of the clamping members and actuating members respectively are connectable by a connecting conduit to a compressed air source and at least one sensor is provided for sensing compressed air flow in the connecting conduit.

This now makes it possible by simple ways and means to detect whether the clamping members are locked or released. Namely, as soon as the compressed air flow in the connecting conduit exceeds a predefined limit it is reliably detected that one or more feedthru bores is/are not correctly closed, indicating that the clamping members are not correctly locked or released. This thus satisfies the basic requirement of making it easy to detect whether the clamping members are correctly locked and/or released. In particular, when the clamping members are not locked or released as wanted, the corresponding feedthru bore is not closed off, as is detected by the flow sensor due to an appreciable compressed air flow existing in the connecting conduit.

DESCRIPTION OF THE FIGURES

A preferred example embodiment of the clamping fixture in accordance with the invention will now be detailed with reference to the attached drawings in which.

DESCRIPTION OF THE EMBODIMENTS

Figure 1:
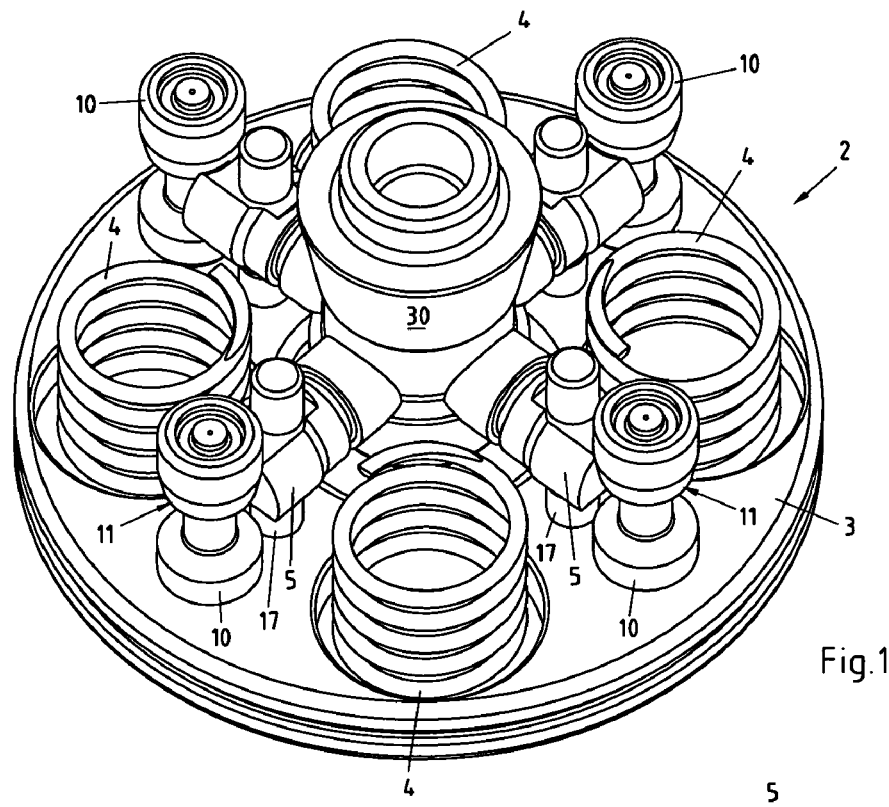
FIG. 1 is a view in perspective of a locking mechanism for a chuck.

Referring now to FIG. 1 there are illustrated the salient parts of a locking mechanism 2 for a chuck together with a clamping spigot 30 in a view in perspective. The locking mechanism 2 comprises substantially an actuating piston 3, four compression springs 4, four clamping members 5 as well as actuating members in the form of four locking pins 10 and four opening pins 13. The actuating piston 3 is supported by means of the compression springs 4 at an upper housing part (not shown) of the chuck, the compression springs 4 in the assembled condition of the chuck urging the actuating piston 3 into its bottom position in which the locking mechanism is in the locked condition. Both the locking pins 10 and the opening pins 13 are securely connected to the actuating piston 3. The plunger-type clamping members 5 serve to fixedly locate the clamping spigot 30 in the chuck, they simultaneously loading the clamping spigot 30 axially, i.e.—in the Z direction to draw it together with the workpiece pallet on which the clamping spigot 30 is usually secured against the chuck.

The locking pin 10 features a ramped pressure surface 11 which urges each clamping member 5 on downwards motion of the piston 3 radially inwards into its locked position. Since the compression springs 4 are biased to hold the piston 3 in its bottom position, the clamping members 5 are arrested by the locking pin 10 in their locked position until the piston 3 is pneumatically travelled upwards into its released position. On upwards travel of the piston 3 the clamping members 5 are shifted radially outwards as detailed below. Instead of four locking pins 10 it is, of course, just as possible that variants with more, or less, than four locking pins are feasible, but at least two locking pins need to be provided.

Figure 1A:
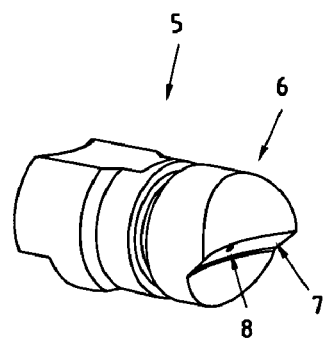
FIG. 1a is a magnified view of a clamping member.

The header of each clamping member 5 facing the clamping spigot 30 is provided with a face adapted to the outer contour of the clamping spigot 30, the face making full surface contact with the clamping spigot 30 in the locked position of each clamping member 5. Referring now to FIG. 1a there is illustrated a clamping member 5 in a magnified front view in perspective. The header 6 of the clamping member 5 features a curved pressure surface 7 porting centrally into a bore 8. This pressure surface 7 is adapted to the contour of the clamping spigot so that the clamping member 5 is in full surface contact with each clamping spigot by its curved pressure surface 7.

Figure 2:
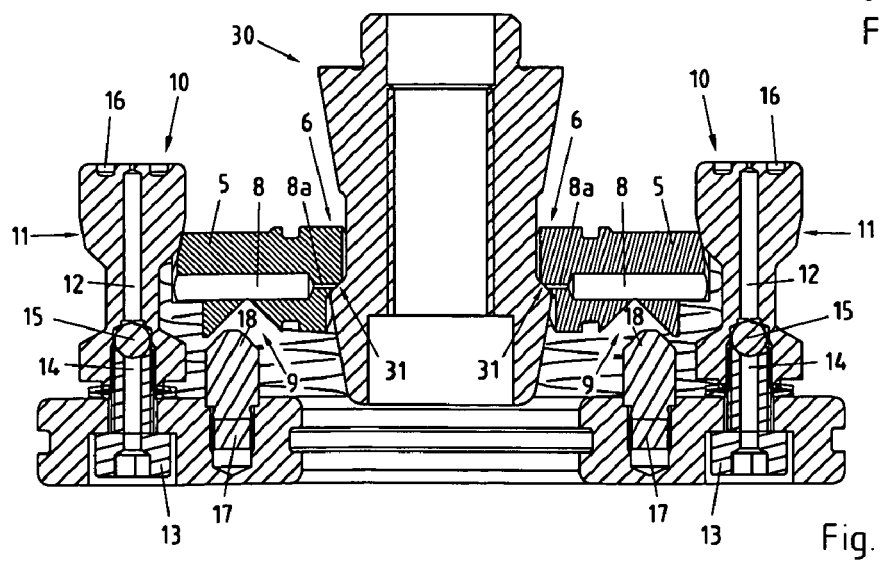
FIG. 2 is a longitudinal section through the locking mechanism as shown in FIG. 1 together with a clamping spigot.

Referring now to FIG. 2 there is illustrated a longitudinal section through the locking mechanism 2 as shown in FIG. 1 together with a clamping spigot 30. This illustration makes it clear how in the bottom position, in other words the locked position, of the piston 3, each locking pin 10 urges by its pressure surface 11 the corresponding clamping member 5 radially inwards into its locked position. It is in this locked position that each clamping member 5 is in full surface contact by its face with an annular surrounding clamping surface of the clamping spigot 30 formed by a shoulder 31. It is furthermore evident how each clamping member 5 features a feedthru bore 8 passing from the rear end longitudinally through the complete clamping member 5 and porting from the header 6 at the front end in the form of a small-diameter bore 8a. When each clamping member 5 in the locked position is in full surface contact with the shoulder 31 of the clamping spigot 30 the feedthru bore 8 is closed off at the front end by the clamping spigot 30. Also evident is how each clamping member 5 features at its underside a conical recess 9 into which each opening pin 13 engages on upwards motion by its conically tapered front end 18 such that the corresponding clamping member 5 is shifted radially outwards to release the lock. Evident in conclusion is how each locking pin 10 is secured by means of a bolt 13 to the piston 3. Both the locking pin 10 and the bolt are provided with a feedthru bore 12, 14. Interposed between the feedthru bore 14 of the bolt 13 and that of the locking pin 10 is a ball 15 acting as a check valve, the functioning of which is detailed below.

Figure 3:
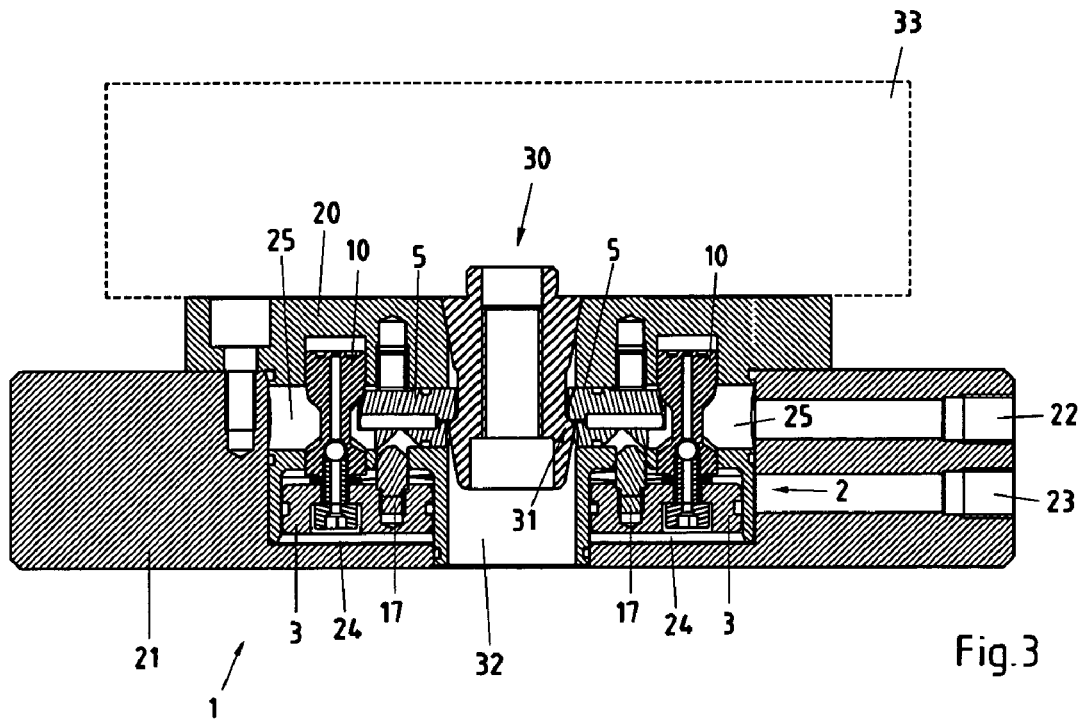
FIG. 3 is a longitudinal section through the complete chuck with the locking mechanism activated.

Referring now to FIG. 3 there is illustrated a cross-section through the chuck 1 provided with a locking mechanism 2 configured as shown in FIG. 2. Indicated furthermore diagrammatically is a workpiece pallet 33 to which the clamping spigot 30 is secured. The expression workpiece pallet represents a clamping part for fixedly locating not just workpieces but, where necessary, also tools or other members for chucking by the chuck 1. The locking mechanism 2 is shown in the locked condition. It is evident how the chuck 1 comprises a housing upper part 20 and a housing lower part 21, between which the locking mechanism 2 is interposed. This illustration shows in addition the passageways 22, 23 leading radially into the housing lower part 21 of the chuck and serving to communicate the compressed air feed. The chuck 1 is provided with a central aperture 32 to receive the clamping spigot 30, the clamping members 5 being shiftable transversely to the longitudinal centerline of this aperture 32. The workpiece pallet 33 features centering members (not shown) which cooperate with further centering members arranged on the chuck 1 such that the workpiece pallet 33 is positioned in the X and Y direction when clamping in the chuck 1.

The upper passageway 22 ports into an annular pressure chamber 25 which is sealed off ambiently. All clamping members 5 extend by their rear end into this pressure chamber 25 so that the feedthru bore 8 through each clamping member 5 communicates with the pressure chamber 25, resulting in the feedthru bores 8 of all clamping members 5 being pneumatically connected in parallel and connected to the upper passageway 22. To check the locked condition of the clamping members 5 and to urge the clamping members 5, where necessary, additionally radially inwards against the clamping spigot 30, compressed air is fed via the upper passageway 22. This compressed air flows from the upper passageway 22 into the pressure chamber 25 as well as into the bores 8 leading through each clamping members 5. As soon as all clamping members 5 are in contact with the clamping spigot 30 the compressed air flow quickly drops to near zero as sensed by a corresponding sensor as is detailed below.

The lower passageway 23 communicates with an annular pressure space 24 configured below the piston 3, the passageways leading from passageway 23 into the pressure space 24 not being evident in this illustration. The compressed air fed via the lower passageway 23 serves to lift the piston 3. This results in the compressed air needed to open the locking mechanism 2 being fed via the lower passageway 23 whilst via the upper passageway 22 the compressed air serving to reclamp the locking mechanism 2 is introduced. In both cases the compressed air feed serves also to check the condition of the chuck 1, however, namely as to whether the clamping members 5 of the locking mechanism 2 are correctly locked/released as detailed below. Compressed air for cleaning the contact surfaces can also be fed via the lower passageway.

Figure 4:
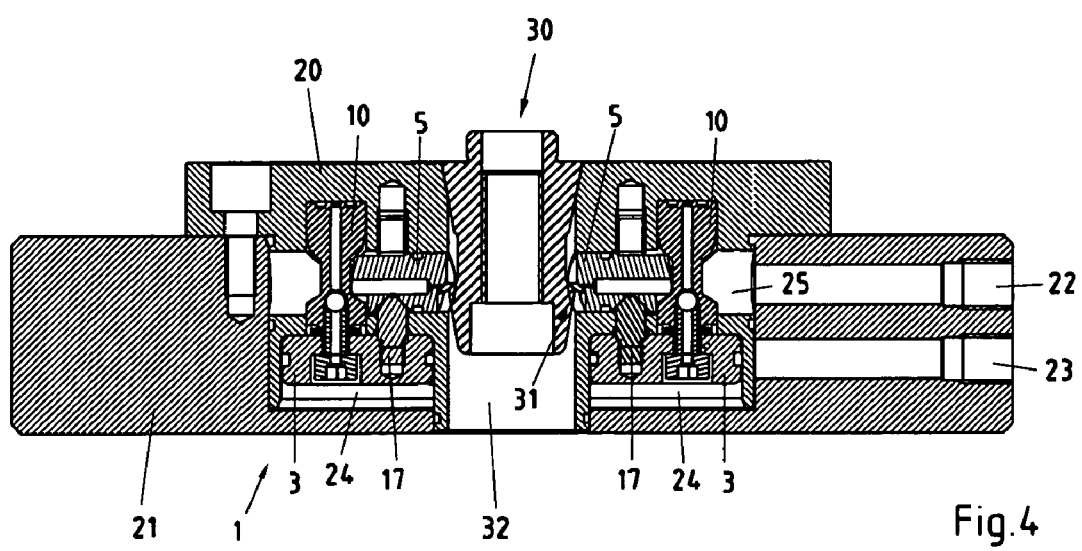
FIG. 4 is a longitudinal section through the complete chuck with the locking mechanism non-activated.

Referring now to FIG. 4 there is illustrated a cross-section through the chuck 1 as shown in FIG. 3 in which the clamping members 5 of the locking mechanism 2 are in the released position. To release the clamping members 5 compressed air is supplied via the lower passageway 23 to gain access to annular space 24 arranged below the annular piston 3 so as to lift the piston 3 in overcoming the force of the compression springs, likewise causing the locking pins 10 and opening pins 17 to be urged upwards. It is in this upwards motion of the locking pins 10 that their ramped pressure surface is unseated from the rear end of each clamping member 5 so that each can be shifted radially outwards by the corresponding opening pin 17. In the released position of the locking mechanism 2 the clamping spigot 30 can be extended into and retracted from the central aperture 32 of the chuck 1.

Figure 5:
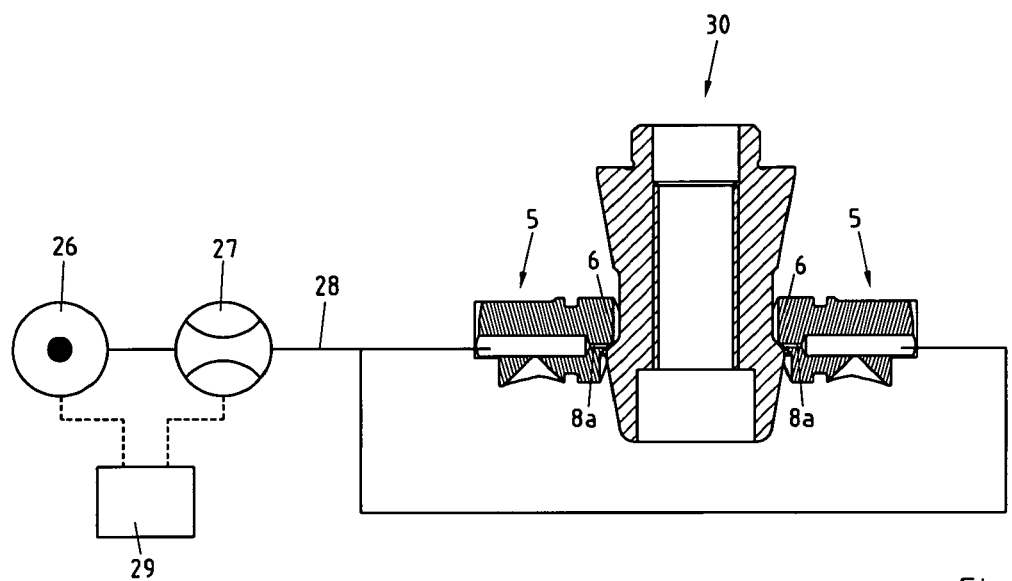
FIG. 5 is a longitudinal section through the clamping spigot as well as two clamping members in the locked condition together with further members of the clamping fixture.
Figure 6:
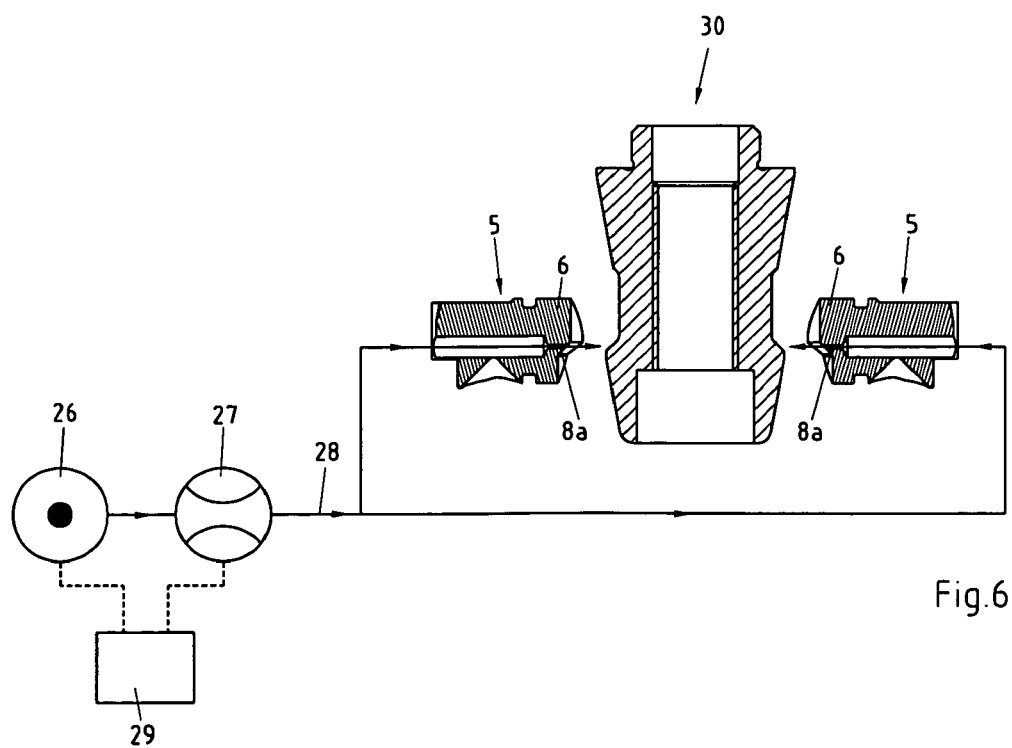
FIG. 6 is a longitudinal section through the clamping spigot as well as two clamping members in the released condition together with further members of the clamping fixture.

Referring now to FIGS. 5 and 6 there is illustrated a longitudinal section through two clamping members 5 together with a clamping spigot 30 as well as further members shown diagrammatically to assist in explaining how correct locking of the clamping members 5 can be checked. In addition to the actual chuck the clamping fixture includes a compressed air source 26, a sensor 27 for sensing compressed air flow, a connecting conduit 28 as well as an electronic controller/analyzer 29. In the locked condition as shown in FIG. 5 the clamping members 5 are in full surface contact by the their header 6 with the shoulder of the clamping spigot 30. As already explained above, the clamping members 5 are urged by the locking pins (not shown) radially inwards into their locked position. When compressed air is then fed from the compressed air source 26 it flows via the connecting conduit 28 to the clamping members 5 respectively to each longitudinal bore 8, 8*a*. Since the clamping members 5 are in full surface contact by their header 6 with the shoulder of the clamping spigot 30 each longitudinal bore 8*a* is closed off at the end. Since the cavities of the chuck, namely the pressure chamber 25 (FIG. 3) receive(s) a flow of compressed air, the compressed air flow in the connecting conduit 28 becomes near zero because the compressed air cannot escape via the longitudinal bore 8, 8*a* leading outwards from the pressure chamber 25.

But should one or more of the clamping members 5 fail to be in tight contact with the clamping spigot 30 the compressed air can escape via each longitudinal bore 8 into the central aperture 32. In other words, should at least one of the longitudinal bore 8, 8*a* leading through the clamping members 5 fail to be closed off by the clamping spigot 30 the compressed air flowing through the connecting conduit 28 will be sensed by the sensor 27 and correspondingly detected and analyzed by the electronic controller/analyzer 29. Since all clamping members 5 are pneumatically connected in parallel it can always be detected whether all clamping members 5 are correctly locked or whether at least one of the clamping members 5 is incorrectly locked. Note that the check valve 15 arranged between the feedthru bore 14 of the bolt 13 and the feedthru bore 12 of the locking pin 10 prevents the escape of compressed air from the pressure chamber via the cited feedthru bores 12, 14 (FIG. 2).

FIG. 6 shows the clamping members 5 in the released position, this illustration showing how the compressed air can escape, as indicated by the arrows, via the header 6 or via the bores 8*a* of clamping members 5 not in contact with the clamping spigot 30 porting from the header 6, it being easy to detect any escape of compressed air from one or more clamping members 5 by means of the sensor 27.

Figure 7:
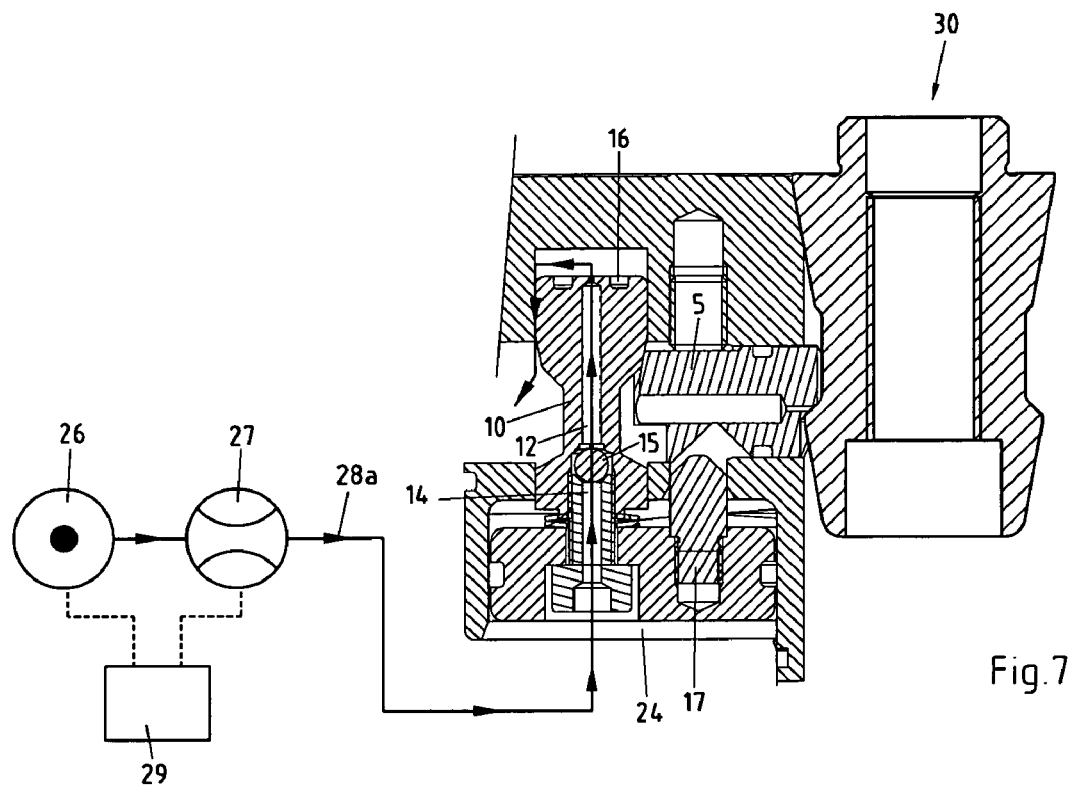
FIG. 7 is a section through part of the locked chuck together with further members of the clamping fixture.
Figure 8:
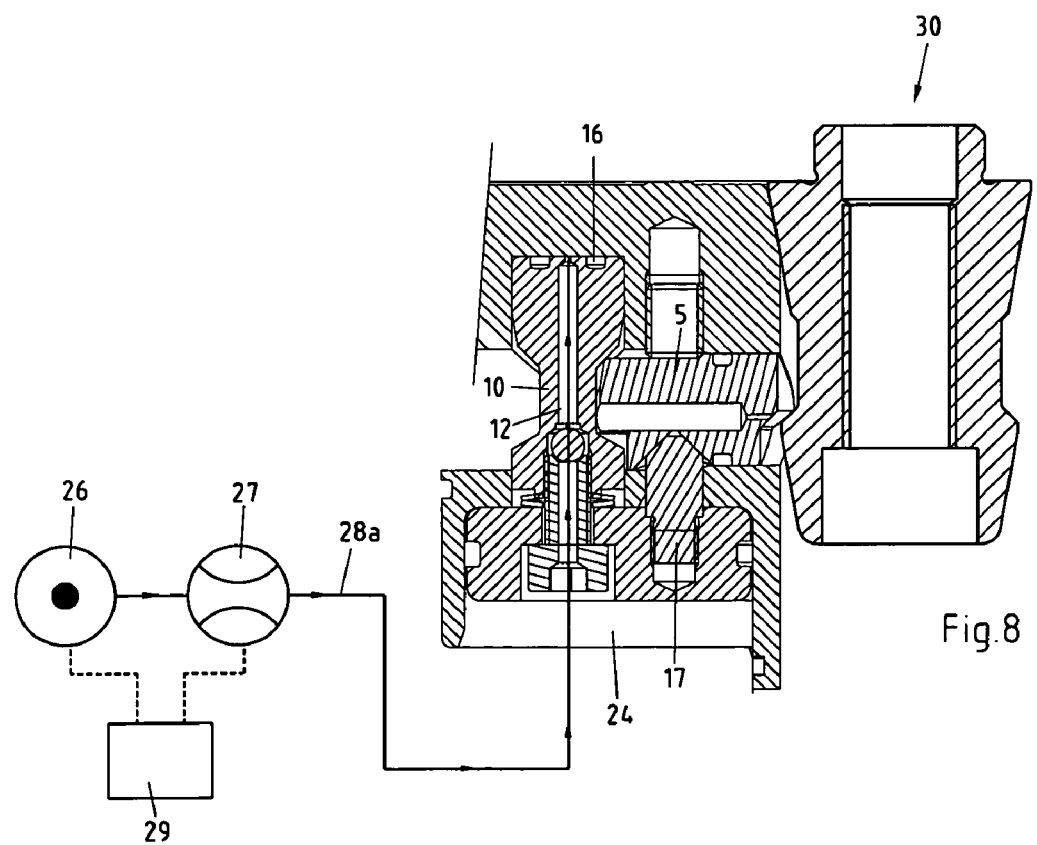
FIG. 8 is a section through part of the chuck fully released together with further members of the clamping fixture.

Referring now to FIGS. 7 and 8 there is illustrated a section through the chuck longitudinally showing diagrammatically the compressed air source 26, the sensor 27 for sensing compressed air flow, a connecting conduit 28*a* as well as the electronic controller/analyzer 29. These figures will now assist in explaining how corresponding release of the clamping members 5 is checked. To release the clamping members 5 compressed air is introduced into the pressure space 24, urging the piston 3 upwards in overcoming the force of the compression springs. Upwards travel of the piston 3 also moves the locking pins 10 as well as the opening pins 17 upwards, unseating the ramped contact surface of the locking pins 10 from the rear end of each clamping member 5 which can then be shifted radially outwards by each opening pin 17. As long as the locking pins 10 have not attained the top position a minor flow of compressed air introduced into the pressure space 24 can escape ambiently via the feedthru bore 14 of the bolt 13 as well as via the feedthru bore 12 of the locking pin 10 into the pressure chamber 25 and from there via a valve (not shown) as is sensed by the sensor 27.

As indicated by the arrows in FIG. 7 the compressed air can emerge upwards from the locking pin 10 via the feedthru bores 12, 14 and the opened check valve 15 and escape via an annular gap between the locking pin 10 and the housing upper part 20. But as soon as the piston 3 has attained its top position, the facing seal 16 of the locking pin 10 comes into contact with the housing upper part 20 to seal off the feedthru bore 12 of the locking pin 10 upwards to thus halt the escape of compressed air and thus its flow sensed by the sensor 27 as is easily detected by the sensor in conjunction with the electronic controller/analyzer 29. FIG. 8 shows the locking pin 10 in its top position. Because upwards travel of the piston 3 automatically results in the clamping members 5 being shifted radially outwards by each opening pin 17, it can be reliably determined by sensing the compressed air flow in the connecting conduit 28*a* whether all clamping members 5 are correctly released.

Thus, functioning of the locking mechanism and of the clamping members 5 can be monitored by a flow sensor arranged remote from the chuck. Instead of the electronic controller/analyzer 29 as described any other electrical, electromechanical or mechanical controller/analyzer, for example, can be employed.

To connect the upper passageway 22 or lower passageway 23 of the chuck (FIG. 3) via each connecting conduit 28 (FIG. 5) or 28*a* (FIG. 7) to the compressed air source 26 valving (not shown) is provided. Although only one compressed air source 26 is shown in the drawings, it is of course just as possible to provide two separate compressed air sources 26. In this case one compressed air source 26 can be provided to feed the upper passageway 22 and the other to feed the lower passageway 23.

When two separate compressed air sources 26 are provided it makes sense to also provide two flow sensors—one for each compressed air source 26—although, of course, it is also possible to provide just one compressed air source 26.

Although in the example as presently described each of all clamping members is provided with a feedthru bore it is just as possible, depending on the application, to provide only one of them with a feedthru bore. To ensure that all clamping members are correctly released, preferably all clamping members in the form of locking pins are provided with a feedthru bore, although again depending on the particular application it would just as possible just one locking pin with a feedthru bore, it being also just as possible to provide go-betweens thereof by some of the clamping members or some of the actuating members featuring a feedthru bore.

Where necessary, the clamping surface engaging the clamping members of the chuck may also be formed directly on the workpiece pallet eliminating the need for a clamping spigot. But in any case, by sensing compressed air flow in the conduit connecting the clamping members of the chuck, reliably detecting whether they are correctly locked or released is assured. It is understood that the compressed air flow need not be absolutely zero for correct locking or releasing. Instead, any critical value can be determined below which a correct locking or releasing can be detected. As compared to conventional spherical-type clamping members the plunger-type clamping members as shown have the advantage of being able to handle high forces by contacting the clamping spigot by a relatively large contact surface.

In addition to the advantages as already cited, the clamping fixture in accordance with the invention has the further advantage that no sensors need to be mounted on the chuck itself, merely two compressed air feeder passageways being needed to interface the chuck and further members of the clamping fixture, in thus, of course, eliminating the need for any electrical wiring between the chuck and its periphery. In the variant of a clamping fixture as described whose chuck simply requires two compressed air feeder passageways serving, among other things, as the interface as well as a flow sensor arranged remote from the chuck, salient functions of the chuck can be monitored and the latter also confirmed. The achievement as described now makes it possible with just two compressed air feeder passageways to:

release the chuck pneumatically
reclamp the chuck pneumatically
monitor correct releasing
monitor correct locking, and to
detect pallet in place/not in place.

The invention claimed is:

1. A clamping fixture comprising a chuck (1) provided with a locking mechanism (2) for releasably locating a workpiece pallet (33), the locking mechanism (2) having a plurality of clamping members (5) which in the locked position are configured to engage a clamping surface (31) arranged at the workpiece pallet (33) or a clamping spigot (30) connected thereto to fixedly locate the workpiece pallet (33) at the chuck (1), wherein at least one clamping member (5) is provided with a feedthru bore (8, 8a) configured so that on correct locking and/or release of the at least one clamping member (5) said bore (8, 8a) of said clamping member (5) is closed off at one end and at least one other clamping member (5) is assigned a locking pin (10) configured to shift the clamping member into a locked position and provided with a feedthru bore (12) which on correct locking and/or release of said one other clamping member (5) said bore (12) is closed off at one end, each feedthru bore (8, 8a, 12) being connectable by a connecting conduit (28, 28a) to a compressed air source (26) and at least one sensor (27) is provided for sensing air flow in the connecting conduit (28, 28a).

2. The clamping fixture as set forth in claim 1, characterized in that all of said plurality of clamping members (5) are provided with a feedthru bore (8, 8a) closable off at one end.

3. The clamping fixture as set forth in claim 1, characterized in that all of said plurality of clamping members (5) are assigned a locking pin (10) provided with a feedthru bore (12).

4. The clamping fixture as set forth in claim 1, characterized in that the clamping members (5) are configured as plungers, comprising a header (6) configured to make full surface contact with the clamping surface of the workpiece pallet (33) or of the clamping spigot (30).

5. The clamping fixture as set forth in claim 4, characterized in that each clamping members (5) is provided with a feedthru bore (8a) porting from the header (6) which can be closed off by a clamping surface of the workpiece pallet (33) or of the clamping spigot (30) when the corresponding clamping member (5) is correctly locked.

6. A clamping fixture comprising:
a chuck (1) provided with a locking mechanism (2) for releasably locating a workpiece pallet (33), the locking mechanism (2) having a plurality of clamping members (5) which in the locked position are configured to engage a clamping surface (31) arranged at the workpiece pallet (33) or a clamping spigot (30) connected thereto to fixedly locate the workpiece pallet (33) at the chuck (1), wherein at least one clamping member (5) is provided with a feedthru bore (8, 8a) configured so that on correct locking and/or release of the at least one clamping member (5) said bore (8, 8a) of said clamping member (5) is closed off at one end, and each clamping member (5) is assigned an actuating member in the form of a locking pin (10) provided with a feedthru bore (12), the feedthru bore (12) being open in the locked position of the corresponding clamping members (5) whilst the feedthru bore (12) is closed off in the correct released position of the corresponding clamping member (5)

each feedthru bore (8, 8a, 12) being connectable by a connecting conduit (28, 28a) to a compressed air source (26) and at least one sensor (27) is provided for sensing air flow in the connecting conduit (28, 28a).

7. The clamping fixture as set forth in claim 1, characterized in that the locking mechanism (2) comprises at least one actuating piston (3) by means of which the clamping members (5) can be shifted into the locked position and/or released position.

8. A clamping fixture, comprising:
a chuck (1) provided with a locking mechanism (2) for releasably locating a workpiece pallet (33), the locking mechanism (2) having a plurality of clamping members (5) which in the locked position are configured to engage a clamping surface (31) arranged at the workpiece pallet (33) or a clamping spigot (30) connected thereto to fixedly locate the workpiece pallet (33) at the chuck (1),
wherein at least one clamping member (5) is provided with a feedthru bore (8, 8a) configured so that on correct locking and/or release of the at least one clamping member (5) said bore (8, 8a) of said clamping member (5) is closed off at one end, and
wherein at least one other clamping member (5) is assigned a locking pin (10) provided with a feedthru bore (12) which on correct locking and/or release of said one other clamping member (5) said bore (12) is closed off at one end, each feedthru bore (8, 8a, 12) being connectable by a connecting conduit (28, 28a) to a compressed air source (26) and at least one sensor (27) is provided for sensing air flow in the connecting conduit (28, 28a), and
further wherein the locking mechanism (2) includes;
at least one actuating piston (3) by means of which the clamping members (5) can be shifted into the locked position and/or released position; and
for each clamping member (5) a locking pin (10) actively communicating with the actuating piston (3), at least one locking pin (10) being provided with a feedthru bore (12) and each feedthru bore (12) being open in the locked position of the corresponding clamping members (5) and closed off in the correct released position of the corresponding clamping members (5).

9. The clamping fixture as set forth in claim 8, characterized in that each locking pin (10) comprises a ramped pressure surface (11) facing the corresponding clamping members (5) by means of which the corresponding clamping member (5) is shiftable into its locked position on shifting of the piston (3).

10. The clamping fixture as set forth in claim 1, characterized in that the chuck (1) comprises a central aperture (32) for receiving a clamping spigot (30) and the clamping members (5) to shiftable transversely to the feedthru centerline of the central aperture (32).

11. The clamping fixture as set forth in claim 1, characterized in that the chuck (1) comprises at least four clamping members (5).

12. The clamping fixture as set forth in claim 8, characterized in that the chuck (1) comprises an air feeder passageway

(23) connected by the connecting conduit (28, 28a) to the compressed air source (26) as well as to a pressure space (24) arranged on the rear side of the actuating piston (3), the feedthru bore (12) of each locking pin (10) connecting said pressure space (24).

13. The clamping fixture as set forth in claim 1, characterized in that the chuck (1) comprises an air feeder passageway (23) connected by the connecting conduit (28, 28a) to the compressed air source (26) as well as to a pressure space (24) arranged on the rear side of the actuating piston (3), the feedthru bore (12) of each locking pin (10) connecting said pressure space (24).

* * * * *